United States Patent Office

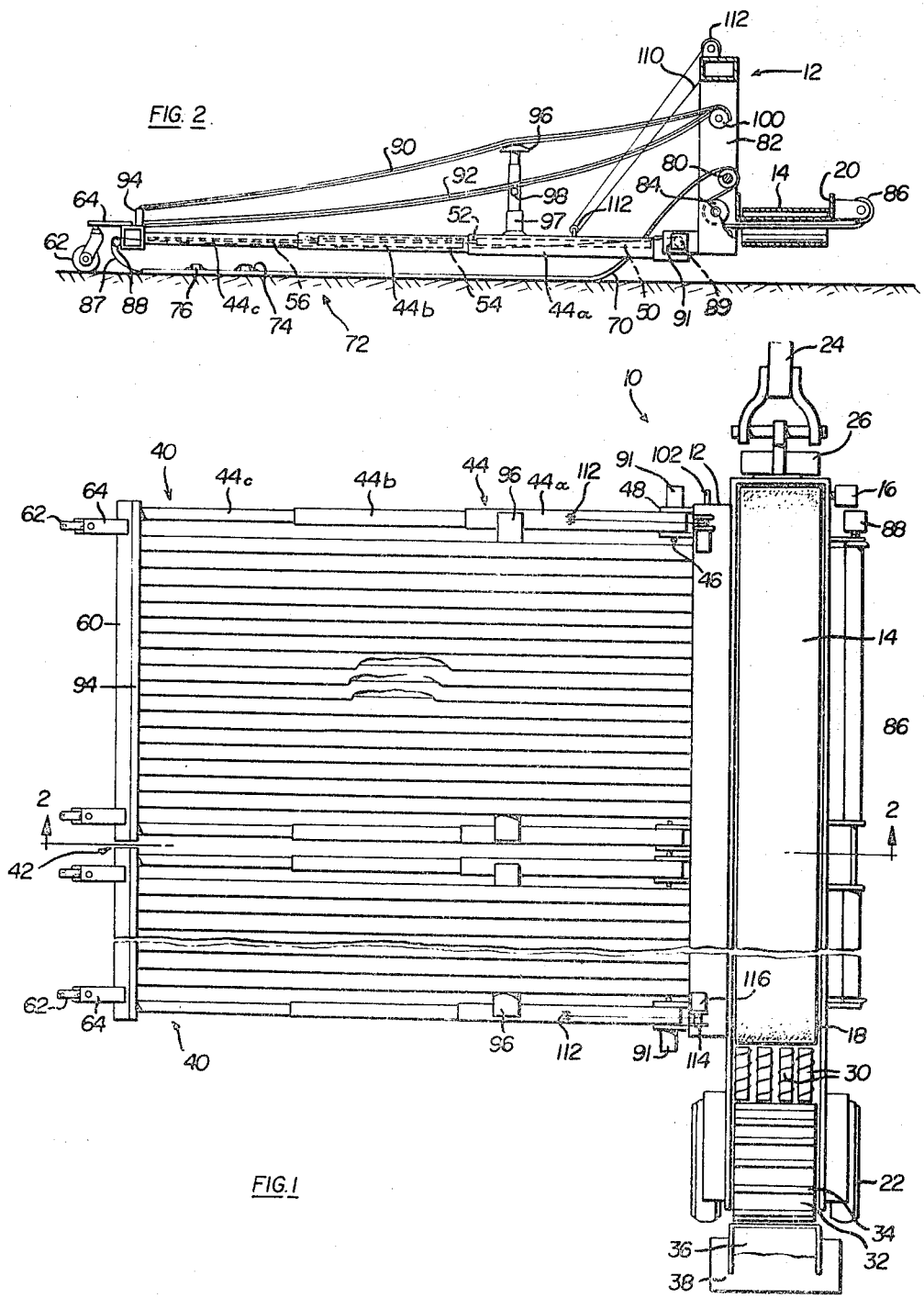

3,543,495
Patented Dec. 1, 1970

3,543,495
HARVESTING MECHANISM
John P. Harvey, Grand Haven, Mich., assignor to Harvey Harvesters, Inc., a subsidiary of Koehring Company, Grand Haven, Mich.
Filed Jan. 31, 1969, Ser. No. 795,457
Int. Cl. A01g 19/00
U.S. Cl. 56—329         6 Claims

ABSTRACT OF THE DISCLOSURE

A fruit harvester having a main frame housing, a conveyor with transversely extending collector units extending from the main frame and pivotally connected to the main frame. The collector units each include extensible frame elements and a collector canvas and decelerating strips disposed above the canvas with the strips and canvas being extensible and retractable to transfer the fruit from the collector canvas to the conveyor and also allow pivotal movement of the collector unit to a vertical transport position.

BACKGROUND OF THE INVENTION

The present invention relates generally to crop harvesting machines and more particularly to an improved fruit harvesting mechanism which is utilized for collecting the fruit removed from a tree.

It has been conventional practice in commercial harvesting of fruits, such as apples, to surround a crop bearing tree with a fruit catching member and shake the tree to loosen the crop and thereafter to, in some manner or other, remove the fruit from the member by various means. Of course, in harvesting large fruit trees, such as apple trees, such units are required to cover a large area and it has been conventional practice to provide some type of conveying mechanism which has fixed dimensions that are equal to the diameter of the largest tree which is to be harvested with the mechanism.

Such an apparatus has many serious drawbacks since it is virtually impossible to transport the mechanism from one orchard to another. Ofttimes, such machines require complete disassembly in order to allow transportation of the machine along highways or other publci facilities.

While many types of flexible units have been proposed, none of these devices have found any commercial success due to various shortcomings of the respective devices.

SUMMARY OF THE INVENTION

The present invention provides an improved fruit harvesting apparatus which is capable of being simply and effectively collapsed to a small transverse dimension so as to be able to be transported on highways or other public roads. Also, the machine of the present invention provides an improved type of collector unit which is simple and inexpensive in construction and yet performs its intended function with greater efficiency than heretofore known.

Generally speaking, the present invention includes a main frame having a longitudinally extending conveyor supported thereon with transversely extending collector units pivotally supported on one side of the main frame. Each collector unit includes an extensible frame unit and an extensible and retractable collector canvas which is capable of receiving the fruit being harvested and transferring the fruit to the main conveyor. Each collector unit also includes an improved type of decelerating mechanism which is capable of decelerating the harvested fruit to a velocity which will not injure fruit, such as peaches and apples, when the fruit strikes the collecting canvas.

Thus, the primary object of the present invention is to provide an improved collecting unit for collecting fruit loosened from tree crops and the like.

Another object is to provide an improved collector unit which is capable of simply and efficiently being collapsed by a single operator to a convenient size for transport purposes.

A further object is to provide an improved harvesting machine which is simple and inexpensive in construction as well as operation.

Other objects of this invention will appear in the following description and appended claims reference being had to the accompanying drawings forming a part of this specification wherein like reference characters designate corresponding parts in the several views.

As shown on the drawings:

FIG. 1 is a plan view of a fruit harvester, constructed in accordance with the present invention; and FIG. 2 is a vertical sectional view taken generally along lines 2—2 of FIG. 1.

The fruit harvester 10 shown in FIGS. 1 and 2 includes a main frame 12 supporting a longitudinally extending conveyor 14 driven at one end by a motor 16, preferably of the hydraulic fluid type and supported at its opposite end on the main frame by an idler roller 18. The upper run of the conveyor 14 is disposed in a trough 20 forming part of the main frame of the machine while the lower run is preferably disposed below the substantially U-shaped trough 20.

The main frame 12 is supported adjacent one end thereof on a pair of wheels 22 which are preferably steerable so as to control the direction of movement of the rear end of the machine. The forward end of the machine includes a conventional hitch mechanism 24 which is connectable to a tractor or other source of transportation. Preferably, the entire control mechanism for driving the various units of the device is a pressured fluid control system 26 which drives the various fluid motors which will be referred to hereinafter. Of course, it is readily apparent that the entire device could be of the self-propelled type by having a power and drive mechanism with wheels at the forward end to replace the conventional hitch 24.

Adjacent one end of the main conveyor 14 are disposed a plurality of longitudinally extending rollers 30 which are slightly spaced with respect to each other and which are all preferably driven by a common power source (not shown). The rollers are preferably downwardly and rearwardly inclined for a purpose which will become apparent hereinafter.

Adjacent one end of the rollers 30 is an upwardly and rearwardly inclined auxiliary conveyor 32 which has slats 34 disposed on the peripheral surface thereof so as to transport fruit received from the main conveyor 14 and the longitudinally extending rollers 30 and raise the fruit to an elevated collection chute 36 wherein the fruit drops to crates 38 disposed below the collection chute 36. Of course, the fruit is received onto the main conveyor and passes over the longitudinally extending roller so as to allow debris and other matter to be removed therefrom by passing between the rollers 30 whereupon the fruit is elevated by the conveyor 34 and is eventually crated in boxes 38.

According to the primary aspect of the present invention, the harvesting mechanism 10 includes a plurality of transversely extending collector units 40, two of which are shown in FIG. 1 and which would normally be utilized in harvesting tree bearing fruit. The adjacent ends of the respective units are slightly spaced from each other as indicated by the reference numeral 42 so as to allow the respective units to be located on opposite sides of the tree trunk. If desired, a canvas type unit may be disposed in the space between the units after the unit has been located under a tree so that all of the tree bearing fruit will be transferred to the respective collector units. Since the respective collector units are identical in construction, only one will be described in detail.

As shown in FIGS. 1 and 2 the respective collector units each include a pair of transversely extending side members 44 which are pivotally supported adjacent the inner ends on pivot pins 46 carried by brackets 48 fixedly secured to the main frame 12. The pivoted side frame members 44 are preferably of the extensible-collapsible type and are illustratively shown as including three sections 44a, 44b and 44c. Of course, the respective telescoping members may be extended and retracted by any suitable mechanism which is well known in the art and which need not be described in detail. However, for purposes of a complete disclosure, an illustrative mechanism has been disclosed.

As shown in FIG. 2 a first fluid ram has a cylinder 50 connected to section 44a and a piston rod 52 connected to section 44b while a second cylinder 54 is connected to section 44b and its piston rod 56 is connected to section 44c. In a conventional embodiment of this type, suitable rollers or anti-friction devices (not shown) are provided for allowing relative ease in movement between the respective sections. Thus, extension and retraction of the respective sections of the collapsible side members may be accomplished by extension and retraction of the respective fluid rams which are supplied by fluid pressure through conduits (not shown).

The free ends of the two side members of each collector unit are interconnected by a suitable frame element such as beam 60 which is supported above the ground level by small wheels 62 pivotally supported on brackets 64.

Each collector unit also includes a flexible collector element 70 which is adapted to be supported on the ground in the area between the main frame 12 and the frame elements 60 and of course is capable of being extended and retracted to conform to the relative major and minor dimensions of the transversely extending side members. The flexible collector element is preferably a canvas member having a plurality of longitudinally extending and transversely spaced ribs 72. The ribs may be formed by providing small strips of material 74 suitably secured to the upper surface of the canvas so as to provide a pocket therein. Each pocket receives a flexible type batten or collapsible member which is formed of a foam type material. While only two of such ribs 72 are disclosed it is readily apparent that a number of such ribs are located at equally spaced points along the entire length of the canvas.

The collector element is capable of being drawn into a storage position in order to transfer fruit gathered on the collector element into or onto the main conveyor 14 for subsequent transfer to the crates 38. For this purpose, the main frame 12 has a first idler roller 80 supported between vertically extending frame elements 82 and a second idler roller 84 disposed below the first idler roller 80. A third roller 86, which is driven is disposed on the opposite side of the main conveyor and the canvas 70 is passed over the first roller 80 and the second roller 84 and is subsequently collected on the third roller 86 which again may be driven by a suitable hydraulic power source 88.

The collector element is also capable of being extended to a length corresponding to the extended position of the side frame. For this purpose cables 87 are connected to the free end of the canvas and are passed over pulleys 88. The cables extend through the respective side frame members and have their opposite ends connected to respective drums 89 driven by hydraulic motors 91.

According to a further aspect of the present invention, the collector unit further includes a plurality of decelerating strips which are disposed above and spaced from the collector element. In the illustrated embodiment first and second groups of decelerating strips 90 and 92 are shown for a purpose which will become apparent hereinafter.

Each group of strips extend between the end member 60 and the main frame 12. The groups of strips 90 and 92 are of a width and arranged in a spacing so as to allow fruit to pass therebetween but the fruit must engage at least one of the strips during its decent to the lower canvas. Thus, the strips in each group are preferably spaced a distance which is slightly less than the average diameter of the particular fruit being picked and the strips of the respective groups 90 and 92 are arranged in overlapping relationship. By way of example, the strips may be flexible members having a width of eight inches with the spacing between the adjacent edges of adjacent strips being approximately one and one half inches. The center lines of the strips in the second group 92 are then offset four inches from the center lines of the strips in the first group 90.

According to a further aspect of the invention, the first and second groups of decelerating strips 90 and 92 are vertically spaced with respect to each other and with respect to the collector element 70. By way of illustration, the vertical spacing between the strips 90 and 92 may be on the order of eight inches and is accomplished by connecting the free ends of the strips 90 to a vertically extending element 94 carried by the end member 60 with a spacer member 96 supported on a strut 97 extending above the side frame member 44a. The free ends or outward ends of the strips 92 are likewise connected to the vertically extending member 94 at a point spaced below the connection point of the strips 90 and again pass over a guide element 98 so as to provide the appropriate spacing between the respective groups of strips.

The connection between the opposite ends of the respective strips and the main frame member 12 includes a drum 100 driven by a suitable hydraulic power source 102 with all of the strips connected to the drum. Thus, the respective strips may be retracted by suitable actuation of the drum 102.

According to a still further aspect of the present invention, means are provided for pivoting the entire collector unit 40 from the horizontal position shown in FIG. 2 to a vertical position which is substantially parallel to the vertically extending side members 82 of the main frame member 12. In the illustrated embodiment, this means includes a cable 110 for each of the side frame members 44. The cable 110 has one end fixedly secured to the main frame 12 and extends over a pulley 112 fixedly secured to the section 44a of the member 44 and thence passes over a drum 114 driven by a suitable hydraulic motor 116.

The operation of the harvesting mechanism of the present invention is believed to be apparent from the above description. However, for purposes of clarity a brief description appears to be in order.

The harvesting mechanism, as disclosed in the drawings, is in a position to be able to collect harvested fruit which is shaken from a tree by any suitable means. The harvested fruit first engages the decelerating strips 90 during its descent towards the ground. Since the adjacent decelerating strips are spaced a distance slightly less than the minimum diameter of the particular fruit being harvested, each piece of fruit must at some time or other engage at least two of the strips of each of the groups. Thus, after it has passed through the second group of strips, the velocity of the fruit has diminished sufficiently so as to prevent bruising upon striking the canvas 70 disposed on the ground.

After all of the fruit has been removed from a tree and is located on the collector element 70, the hydraulic motor 88 is actuated so as to draw the collector element to the storage position defined on the drum 86. During this process, all of the fruit which is collected on the collector element drops onto the main conveyor 14 as the portion of the collector element passes over the idler roller or drum 80. Of course, all of the fruit received by the main conveyor 14 is passed over the longitudinally extending rollers 30 so as allow all the debris therein to be passed through the spaces between the rollers whereupon the fruit is then received on the upwardly inclined auxiliary conveyor 32 and eventually is deposited into the crates 38.

After all of the fruit has been removed from the canvas, the extensible sections 44b and 44c of the side members 44 are retracted so as to be substantially coextensive with the section 44a. Also, the hydraulic motor 102 is actuated so as to collect the respective strips 90 and 92 on the drum 100. Subsequently, the respective fluid motors 116 are actuated so as to pivot the entire collecting unit which is in its collapsed condition, about the pivot pins 46 from the position shown in FIG. 2 to a position extending vertically and substantially parallel to the vertically extending frame elements 82. Of course, it can be appreciated that now the entire unit is of very nominal width so as to be readily capable of being transported from one picking area to another. Furthermore, the entire unit may be transported on public roads since the transport width of the entire mechanism is now substantially equal to the width of a conventional tractor.

Once the mechanism has been located next to a new tree, the collector units are again pivoted about the pivot pins 46 so as to be located in the substantially horizontal position shown in FIG. 2 and the side frame members 44 are extended which will automatically extend the respective strips 90 and 92 and may, if desired, automatically extend the canvas 70.

As can readily be appreciated from the above description the harvesting mechanism of the present invention provides a simple, inexpensive and efficient manner of harvesting fruit from a tree. The entire device is capable of covering a large area under a fruit tree and yet is capable of being converted to a transport vehicle of relatively small transverse dimensions.

I claim:

1. In a fruit harvester adapted to be disposed under a tree and including a main frame housing a longitudinally extending conveyor and a transversely extending collector unit extending from one side of said main frame, the improvement of said collector unit comprising a side frame having extensible side members and a fixed element interconnecting the free ends of said side members, a flexible collector element adapted to be supported on the ground below said side frame, a plurality of decelerating strips located above and spaced from said collector element, and means on said main frame in juxtaposed relation above said conveyor for drawing said collector element into a storage area on said frame whereby fruit dropping from said tree will be decelerated by said strips and be received on said collector element and actuation of said last means will transfer said fruit from said collector element to said conveyor.

2. A fruit harvester as defined in claim 1, in which said collector element comprises a flexible canvas having transversely spaced longitudinally extending ribs defined on the upper surface thereof.

3. A fruit harvester as defined in claim 2, in which said ribs comprise flexible collapsible members.

4. A fruit harvester as defined in claim 1, including the further improvement of said decelerating strips comprising first and second groups of strips disposed in vertically spaced relation with spaces between strips of each group and the edges of the strips of the respective groups being disposed in overlapping relation.

5. A fruit harvester as defined in claim 4, including the further improvement of a drum carried by said main frame and said strips having opposite ends with one end connected to said drum and the opposite ends of said groups respectively connected at vertically spaced points on said fixed element.

6. A fruit harvester as defined in claim 1, including the further improvement of longitudinally extending pivot members on said main frame with said side frame members having adjacent ends pivoted on said pivot members whereby said collector unit may be pivoted to a vertical position relative to said frame.

References Cited
UNITED STATES PATENTS

| | | | |
|---|---|---|---|
| 2,436,648 | 2/1948 | Isom | 56—329 |
| 3,250,065 | 5/1966 | Frost | 56—329 |
| 3,338,041 | 8/1967 | Arpin | 56—329 |
| 3,347,032 | 10/1967 | Pool et al. | 56—329 |
| 3,462,931 | 8/1969 | Thayer | 56—329 |

RUSSEL B. KINSEY, Primary Examiner